United States Patent [19]

Murakami et al.

[11] Patent Number: 4,766,843
[45] Date of Patent: Aug. 30, 1988

[54] RUBBER OR PLASTIC-COATED ROLLER, METHOD AND APPARATUS FOR PRODUCTION THEREOF

[75] Inventors: Takatoshi Murakami; Toshio Kida, both of Yokohama; Shiji Kon, Sagamihara; Toshinobu Asai, Yokohama; Yoshiyuki Nunome, Kawasaki, all of Japan

[73] Assignee: Showa Electric Wire & Cable Co, Ltd., Kanagawa, Japan

[21] Appl. No.: 891,660

[22] Filed: Aug. 1, 1986

[30] Foreign Application Priority Data

Aug. 2, 1985 [JP] Japan .................................. 60/171640
Aug. 26, 1985 [JP] Japan ........................ 60/129819[U]

[51] Int. Cl.⁴ .............................................. B05D 1/00
[52] U.S. Cl. ...................................... 118/661; 428/35
[58] Field of Search ...................... 118/661; 428/35, 36

[56] References Cited

U.S. PATENT DOCUMENTS

| | | | |
|---|---|---|---|
| 3,437,032 | 4/1969 | Manghirmalani et al. | 100/93 |
| 3,724,983 | 4/1973 | Nelson | 425/129 |
| 3,830,199 | 8/1974 | Saito et al. | 118/661 |
| 3,967,020 | 6/1976 | Uemura et al. | 428/36 |
| 3,970,495 | 7/1976 | Ashton et al. | 428/36 |
| 4,002,715 | 1/1977 | Usui | 428/36 |
| 4,005,234 | 1/1977 | Stroupe | 428/36 |
| 4,288,058 | 9/1981 | Inman | 249/134 |
| 4,643,925 | 2/1987 | Smith | 428/35 |

Primary Examiner—Richard Bueker
Attorney, Agent, or Firm—Finnegan, Henderson, Farabow, Garrett & Dunner

[57] ABSTRACT

This invention concerns particularly a rubber or plastic-coated roller such as a fixing roller to be used in a thermal fixing part of an electrophotographic copying machine, and a method and an apparatus for production thereof. It effects the production of the rubber or plastic-coated roller by placing a cylindrical mold upright, fitting into the lower part of the cylindrical mold a lower plug provided in the inside thereof with a tapered surface for guiding a core shaft and at the center thereof with a material injection hole, inserting into the cylindrical mold the core shaft having tapered surfaces one each the opposite ends thereof or the core shaft having tapered surface one each at the opposite ends thereof and covered with caps, fitting into the upper part of the cylindrical mold an upper plug provided in the inside thereof with a tapered surface for guiding the core shaft and at the center thereof with an air vent, injecting liquid rubber or plastic under pressure into the cylindrical mold via the material injection hold of the lower plug, and allowing the injected rubber or plastic to set. By this method, there is produced a coated roller the rubber or plastic layer of which is free from eccentricity, and requires no secondary fabrication such as polishing.

7 Claims, 5 Drawing Sheets

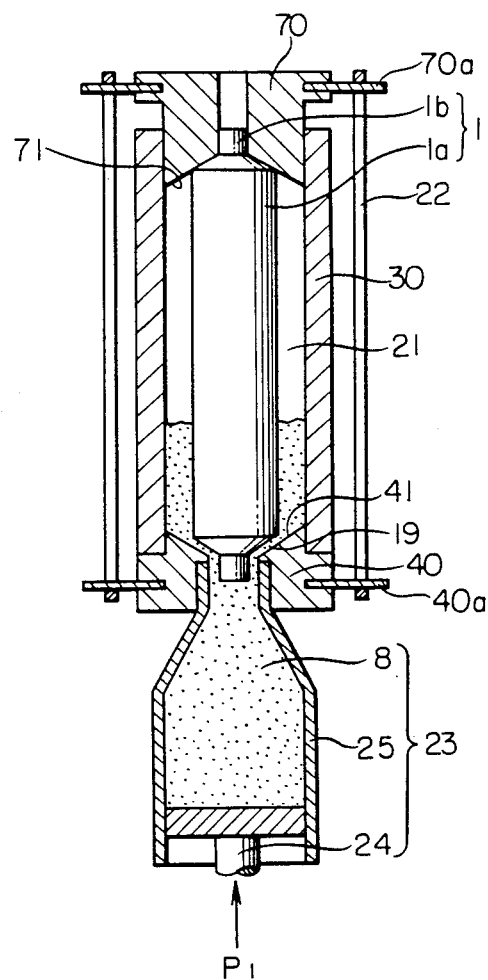
FIG. I

FIG. 2-a
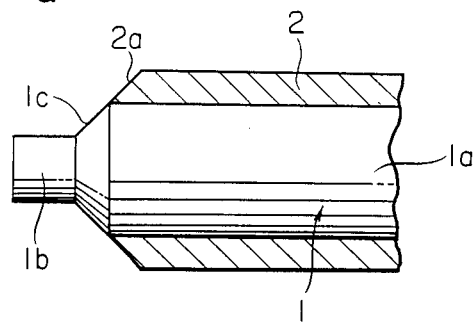
FIG. 2-b
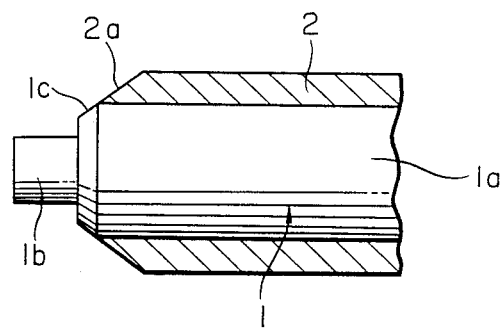
FIG. 2-c
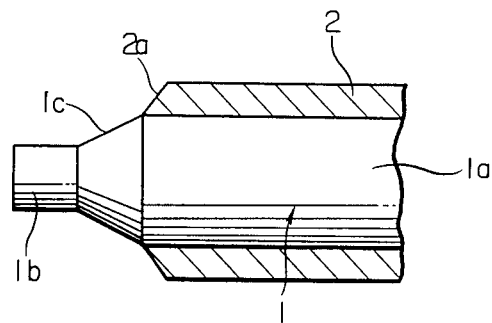

FIG. 3
FIG. 4
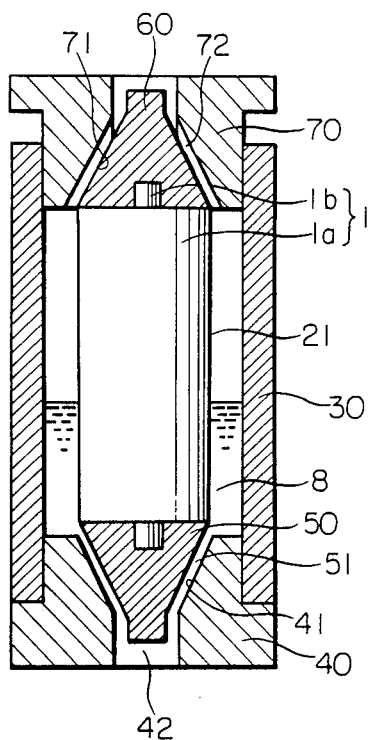
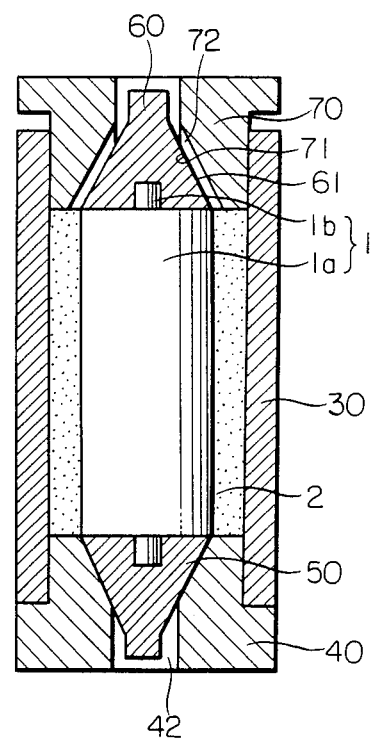

FIG. 6
FIG. 7
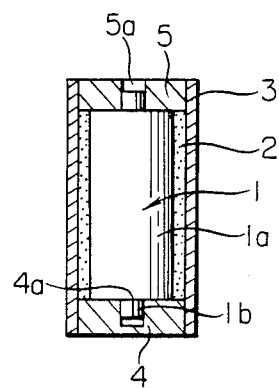
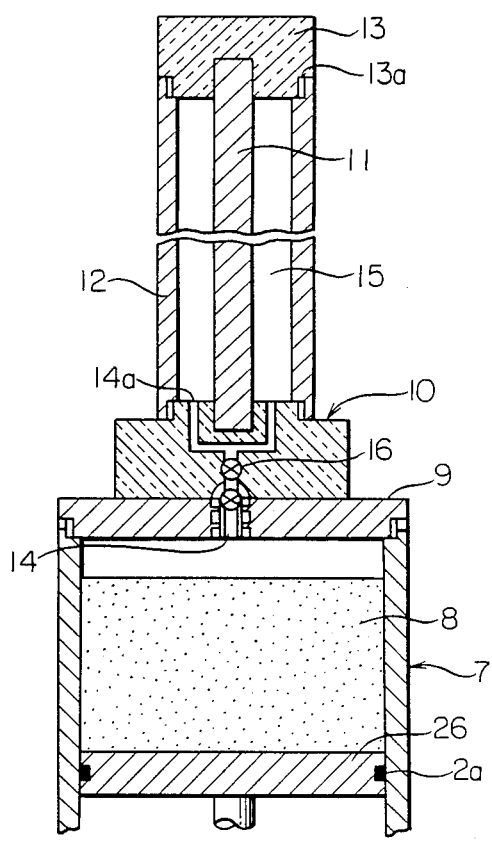

RUBBER OR PLASTIC-COATED ROLLER, METHOD AND APPARATUS FOR PRODUCTION THEREOF

The present application claims priority of Japanese Patent Application Ser. No. 60-171640 filed on Aug. 2, 1985 and Japanese Utility Model Application Ser. No. 60-129819 filed on Aug. 26, 1985.

FIELD OF THE INVENTION AND RELATED ART STATEMENT

This invention relates to particularly a rubber or plastic-coated roller such as a fixing roller to be used in the thermal fixing part of an electrophotographic copying machine, and to a method for production thereof and an apparatus for working the method mentioned above.

The rubber or plastic-coated roller heretofore used in the thermal fixing part of the electrophotographic copying machine has been formed, as illustrated in FIG. 6, of a core shaft 1 consisting of a core shaft proper 1a and a support part 1b and a rubber or plastic layer 2 formed on the periphery of the core shaft proper 1a. It is produced by the following method as described in Japanese Patent Publication SHO No. 55(1980)-30967. With reference to the diagram, a bottom member 4 having a blind hole 4a formed at the center on the upper side thereof is fitted into the lower part of a cylindrical mold 3 and a prescribed amount of liquid rubber or plastic is poured into the cylindrical mold 3. Then, a core shaft 1 is inserted into the cylindrical mold 3, the support part 1b of the core shaft 1 is fitted in the blind hole 4a, and the core shaft 1 is fixed in position by fitting into the upper part of the cylindrical mold 3 a retainer lid 5 provided at the center thereof with a support hole 5a adapted to support shaft 1.

In the state consequently assumed, the liquid rubber or plastic is left standing for a while until the rubber or plastic material is set. Subsequently, the core shaft 1 is drawn out of the cylindrical mold 3 to produce a rubber or plastic-coated roller.

When the production of the rubber or plastic-coated roller is carried out by the method described above, however, the core shaft, during its insertion, is liable to entrain air into the rubber or plastic material. The entrapped air gradually loses buoyancy as the rubber or plastic material gains in viscosity with the advance of its setting. Eventually the air survies in the form of bubbles in the coating layer and causes serious degradation of the roller quality. The retainer 5 is provided with an air vent (not shown). The rubber or plastic material, when cured, gives rise to burrs in the part corresponding to the air vent so that the produced rubber or plastic-coated roller requires an extra work for finishing the edge.

Recently, a method for production a rubber or plastic-coated roller by using an apparatus constructed as illustrated in FIG. 7 has been proposed (Japanese Patent Publication SHO No. 59(1984)-371). This method effects the production of the rubber or plastic-coated roller a bottom plate 26 provided with a movable sealing, connecting a receiving base 10 to an upper lid 9 of the container 7, setting a core shaft 11 and a cylindrical case 12 at prescribed positions on the receiving base 10, pressing and fixing them in position with a retainer cap 13 diposed on the case provided with an air vent part 13a, and gradually pushing upwardly the bottom plate 26 thereby causing the rubber or plastic material 8 to be pressed into a cavity 15 via an opening part 14 and a conduit 14a. When the bottom plate 26 held in the state illustrated is pushed upwardly, a check valve 16 is actuated as the inner pressure of the cavity 15 inside the case 12 and the pressure for pushing up the bottom plate 26 are eqilibrated. The rubber or plastic-coated roller is obtained by the fact that the inner pressure of the cavity 15 is retained until the rubber or plastic material is set.

In the apparatus constructed as described above, however, the removal of set material from the opening part, the check valve, and the conduit is exremely difficult. This construction has another disadvantage that the set material forms burrs in the part corresponding to the air vent, causes air bubbles which are not good for the product near the end faces of the rubber or plastic-coated layer, and increases the rejectables.

Further, the conventional roller producing apparatus suffers from yet another disadvantage that during the introduction of liquid rubber or plastic material for replenishment into the container 1, the upper lid 9 fitted to the upper part of the container 7 must be removed and this removal of the upper lid degrades the efficiency of work.

OBJECT AND SUMMARY OF THE INVENTION

This invention has been produced for the purpose of overcoming the conventional drawbacks mentioned above. It aims to provide a method for the production of a rubber or plastic-coated roller, which curbs the entrainment of air into the rubber or plastic layer, substantially obviates the necessity for such secondary fabrication as polishing otherwise required after the setting of the liquid rubber or plastic, permits manufacture of rollers of high dimensional accuracy, and enables the apparatus to be readied by simple cleaning for subsequent cycles.

The method for the production of a rubber or plastic-coated roller contemplated by the present invention and the apparatus for working this method are charactrized by a procedure which comprises setting a cylindrical mold upright, fitting into the lower part of the cylindrical mold a lower plug provided in the inside thereof with a tapered surface for guiding a core shaft and at the center thereof with a material injection hole, inserting into the cylindrical mold a core shaft provided with tapered surface one each at the opposite ends thereof or a core shaft provided with tapered surfaces one each at the opposite ends thereof and covered with caps, fitting into the upper part of the aforementioned cylindrical mold an upper plug provided in the inside thereof with a tapered surface for guiding the core shaft and at the center thereof with an air vent, injecting liquid rubber or plastic into the cylindrical mold through a material injection hole formed in the aforementioned lower plug, and allowing the liquid rubber or plastic to set.

The apparatus of the present invention for supply of the material for the roller producing comprises a storage tank having an open mouth formed in the upper part thereof and containing a liquid molding material therein, a hollow cylindrical member held upright by a first vertically movable support frame and provided in the lower part thereof with a valve member, a hollow piston member supported on the aforementioned first support frame by means of a second vertically movable support frame, inserted into said hollow cylinder member, and provided in the lower part thereof with a valve member, and a metal die attached to the upper end of the hollow piston member through the medium of an injection tube, whereby the replenishment of the material can be carried out with simplicity, and the manufacture of rollers of high accuracy can be performed efficiently.

BRIEF DESCRIPTION OF THE DRAWINGS

FIG. 1 is a longitudinal cross section illustrating one embodiment of a rubber or plastic-coated roller producing apparatus of this invention.

FIGS. 2a to 2c are longitudinal cross sections illustrating rubber or plastic-coated rollers produced by the apparatus of this invention.

FIG. 3 and FIG. 4 are longitudinal cross sections of a rubber or plastic-coated roller producing apparatus of a second embodiment of this invention.

FIG. 6 and FIG. 7 are longitudinal cross sections of conventional roller producing apparatus.

DETAILED DESCRIPTION OF THE PREFERRED EMBODIMENT

Figure 5:
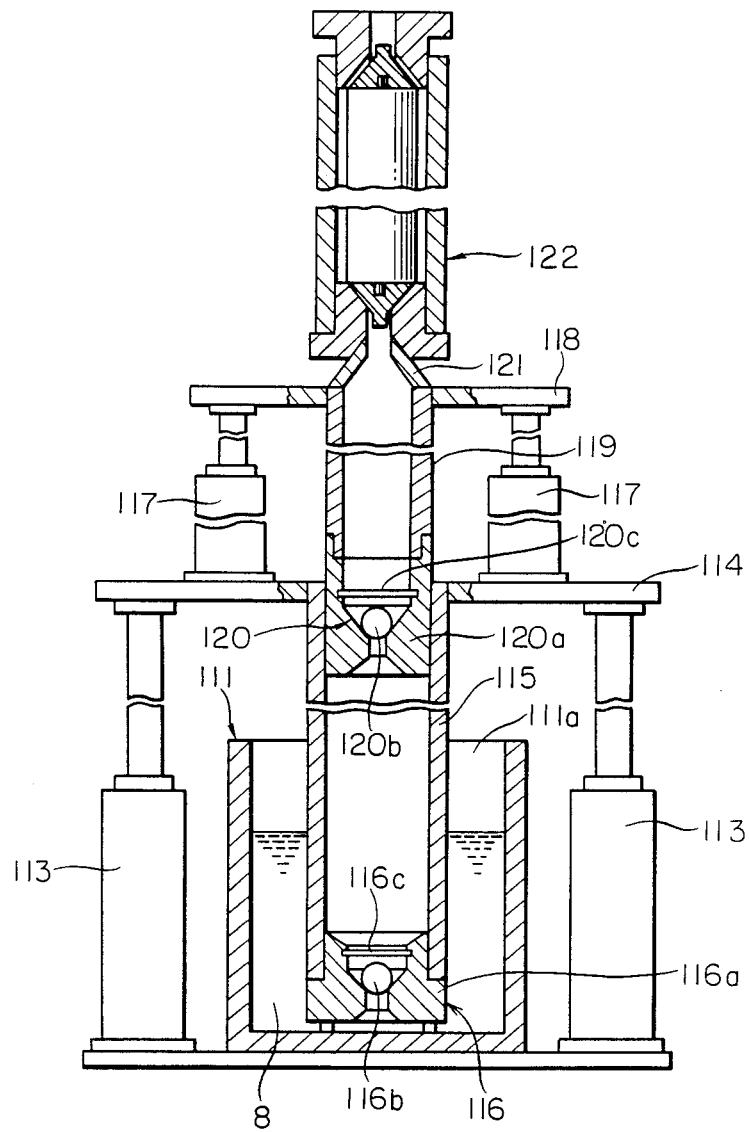
FIG. 5 is a longitudinal cross section illustrating further the other embodiment of a roller producing apparatus of the present invention.

Now the present invention will be described in detail below with reference to working examples.

EXAMPLE 1

FIG. 1 is a longitudinal cross section schematically illustrating a typical embodiment of a method and apparatus for the production contemplated by this invention. This apparatus is furnished with a cylindrical mold 30 possessing an inside diameter equalling the diameter of a roller being molded and a lower plug 40 detachably fitted into the lower part of the cylindrical mold 30, and an upper plug slidably fitted to the upper part of the cylindrical mold 30. In the inside endface of the lower plug 40, disposed a tapered surface 41 contacted with a tapered surface 19 of a core shaft 1a, and a material injection hole 42 is disposed in a shaft center of the lower plug 40.

The inside endface of the upper plug 70 incorporated therein a tapered surface 71 for guiding the core shaft. Protruding portions 40a and 70a are disposed in the side of the lower plug 40 and the upper plug 70 respectively. There is also provided an elastic member 22 such as a rubber ring or a coil spring having one end thereof hung on the upper plug 70 and the lower plug 40 alternately.

The apparatus is further provided with a rubber or plastic material injection machanism, 23 communicating with the central hole of the core shaft. This rubber or plastic material injection mechanism 23 is a cylindrical container 25 which is provided with a piston 24 and contains therein the rubber or plastic material 8 treated in advance for deaeration under a vacuum. Concrete examples of the rubber or plastic material for the roller molding include silicone rubber, thiokol rubber, chloroprene rubber, butadiene rubber, polyurethane rubber, elastic epoxy resin, styrenebutadiene block polymer, thermoplastic polyurethane, polyether-polyester block polymer, trans- and 4-polyisoprene, thermoplastic polyolefin, butyl-, craft-, and ethylene-based thermoplastic elastomers, and even methyl methacrylate, 6-nylon, and general purpose epoxy resin.

Now, the method for the production of a rubber or plastic-coated roller by the use of the producing apparatus of the present invention will be described.

The core shaft 1 is inserted into the cylindrical mold 30 and the upper plug 70 and the lower plug 40 are fitted into the opposite ends respectively.

Then, one end of the ring type elastic member 22 is hung on a protruding portion 70a of the upper plug 70 and the other end thereof on a protruding portion 40a of the lower plug 40, so as to keep both members urged toward each other at all times.

In the condition consequently assumed, the end face 19 of the core shaft and the lower plug 40 are held fast against each other. Then, the lower plug 40 and the container 25 are interconnected and the piston 24 of the rubber or plastic material injection mechanism 23 is elevated. As a result, the flow pressure of the rubber or plastic material 8 gives an upward push to the core shaft 1 and interposes a gap between the end face 19 of the core shaft and the end face 41 of the lower plug 40, to admit the rubber or plastic material 8 into the empty space 21 of the mold. In consquence of this injection of the rubber or plastic material, the air entrapped inside the empty space 21 departs from the space formed between upper plug 70 and the end face of the core shaft 1 while giving a downward push to the lower plug 70. When the empty space 21 is filled with the material 8 and the inner pressure of this empty space 21 and the pressure P1 of the upward push are equilibrated, the core shaft 1 and the upper plug 40 descend and the end face 19 of the roller core shaft and the lower plug 40 jointly function as a check valve, with a result that the inner pressure of the empty space 21 will be kept intact until the rubber or plastic material is set.

Thus, the production of a rubber or plastic-coated roller by the producing apparaus of this invention is accomplished. The rubber or plastic layer of the roller so produced is not found to contain therein any discernible pinhole or bubble. Burrs are partly formed on the end faces of the roller core shaft. Since these burrs are easily ripped off, the end faces of the roller do not require any special secondary fabrication. Further, the producing apparatus of the present invention is such that when it is furnished inside the case thereof waste rubber removal subsequent to the removal of the rubber roller from the mold can be facilitated.

Because of the provision of the mechanism resembling a check valve, the possibility of liquid leakage during the transfer of the case is precluded and the intermittent/continuous injection is made possible.

FIG. 2a is a longitudinal cross section illustrating part of a typical rubber or plastic-coated roller produced by the procedure of Example 1.

With reference to FIGS. 2a to c, in a rubber or plastic-coated roller which is composed of a core shaft 1 consisting of a core shaft proper 1a and support part 1b formed one each at the opposite ends of the core shaft proper 1a and a rubber or plastic layer 2 formed on the periphery of the shaft proper, the end face 1c of the core shaft proper and the end face 2a of the rubber or plastic layer respectively possess tapered surfaces which continue into each other. FIG. 2a illustrates the two tapered surfaces having one and the same angle and FIG. 2b illustrates an end face of the shaft proper which has a flat surface. FIG. 2c illustrates a tapered angle of the core shaft which does not continue into the tapered surface of the rubber or plastic layer.

By the constructures as shown in FIGS. 2a to 2c, the following effects can be obtained.

In the production of the roller, when the rubber or plastic material injected into the cylindrical mold a fluid resistance of the material decreases and it prevents the air entrainment, as a result, the form of bubbles in the coating layer 2 is not caused easily. And the shaft 1 is aligned automatically in the mold, so the obtained roller has a unified wall-thickness. As a result, the secondary fabrication is not required.

EXAMPLE 2

FIG. 3 and FIG. 4 are cross sections illustrating another method and apparatus for the production of a rubber or plastic-coated roller as one embodiment of the present invention. This embodiment comprises a cylindrical mold 30 possessing an inside diameter equalling the diameter of the roller being molded and held upright, a lower plug 40 fitted into the lower part of the cylindrical mold 30, provided in the inside thereof with a tapered surface 41 for guiding the core shaft, and having a material injection hole 42 opened at the center thereof, a pair of caps 50 and 60 fitted to the opposite ends of a core shaft 1 inserted into the cylindrical mold 30 and possessed respectively of tapered surfaces 51, 61, and an upper plug 70 fitted into the upper part of the cylindrical mold 30 and provided in the inside thereof with a tapered surface 71 for guiding the core shaft.

Grooves 72 for release of air are formed as four lines in the tapered surface which is contacted with the cap 60 of the upper plug 70.

The material injection hole 42 in the lower plug 40 is joined to a material injection mechanism similar to the mechanism in Example 1. The upper plug 70 is connected to an upper plug pressing mechanism which is not shown in the diagram.

As the liquid rubber or plastic material 8 to be injected through the material injection hole 42 of the lower plug 40, silicone rubber, thiokol rubber, chloroprene rubber, or elastic epoxy resin can be used, for example.

Now, the method of this invention for producing the rubber or plastic-coated roller by the use of the apparatus constructed as described above will be explained below.

First, the cylindrical mold 30 is set upright, the lower plug 40 is fitted into the lower part of the cylindrical mold 30, and the cap 50 is inserted into the tapered surface 41 of the lower plug 40. Then, the core shaft 1 is inserted into the cylindrical mold 30, the support part 1b at one end is fitted into the cap 50, and the support part 1b at the other end is fitted into the cap 60.

Further, the upper plug 70 is fitted into the upper part of the cylindrical mold 30 and upper plug 70 is pressed with suitable pressure P1 to be exerted by the upper plug pressing mechanism. At this time, the tapered surface 61 of the cap 60 comes into intimate engagement with the tapered surface of the upper plug 70 and the tapered surface 51 of the cap into the tapered surface 41 of the lower plug 40.

Then, the injection mechanism is actuated to admit the liquid rubber or plastic material 8 through the material injection hole 42 of the lower plug 40 under pressure. At this time, the fluid pressure of the rubber or plastic material 8 gives an upward push to the core shaft 1 and the caps 50 and 60 at the opposite ends so as to admit the material 8 through the gap between the tapered surface 41 of the lower plug 40 and the tapered surface 51 of the cap 50 into the empty space 21 intervening between the cylindrical mold 30 and the core shaft proper 1a.

In the meantime, the tapered surface 61 of the cap 60 fitted on the upper part of the core shaft 1 is pressed against the tapered surface 71 of the upper plug 70 and consequently brought into a tight engagement therewith, with a result that the air will be pushed out of the empty space 21 and released through the grooves 72 for air release.

When the inner pressure of the empty space 21 and the pressure for injection of the material are equilibrated, the core shaft 1 and the cap 60 descend under their own weights. Consequently, the tapered surface 51 of the cap 50 fitted on the lower part of the core shaft 1 is pressed against the tapered surface 41 of the lower plug 40 and consequently brought into tight engagement therewith as illustrated in FIG. 4, so that the two tapered surfaces will jointly function as a check valve. As a result, the inner pressure of the empty space 21 is retained intact until the liquid rubber or plastic material is set. After the material is set, the core shaft 1 is pulled out of the cylindrical mold 30 to produce the rubber or plastic-coated roller of the present invention. The rubber or plastic layer 2 of the roller so produced has a unified wall-thickness and is found to contain absolutely no discernible pinhole or air bubbles. When the air release grooves are formed in the tapered surface 71 of the upper plug 70, the burrs partly formed on the end faces of the core shaft are in the shape of cords and therefore can be easily ripped off. Thus, the end faces do not require any special secondary fabrication.

EXAMPLE 3

FIG. 5 illustrates a roller producing apparatus as further another embodiment of this invention. In the diagram, the reference numeral 111 denotes a storage tank having an open mouth 111a formed in the upper part of thereof and containing therein a liquid molding material 8 such as liquid rubber or plastic material. Inside this storage tank 111, a hollow cylindrical member 115 which is attached to a support frame 114 vertically movable by an elevating device 113 such as, for example, a hydraulic cylinder or an air cylinder is held upright. To the lower part of this hollow cylindrical member 115, a valve member 116 is detachably fastened. This valve member 116 comprises a plug member 116a possessing a tapered surface and having a material inlet hole opened at the center thereof, a spherical member 116b adjoining the tapered surface of the plug member 116a, and a pin 116c for preventing the spherical member 116b from slipping. The spherical member 116b assumes an open state when the liquid molding material flows into the hollow cylindrical member 115. When the inner pressure of the hollow cylindrical member 115 is increased, the spherical member 116b is pressed against the tapered surface of the plug member 116a and caused to assume a closed state.

Into the hollow cylindrical member 115 is inserted a hollow piston member 119 which is supported by a support frame 118 attached to the upper part of the support frame 114 vertically movably by an elevating device 117 such as, for example, a hydraulic cylinder or an air cylinder. To the lower part of the hollow piston member 119 is detachably fastened a valve member 120 which is composed of a plug member 120a, a spherical member 120b, and a pin 120c similar to the valve member 116 mentioned above. To the upper part of the hollow piston member 119, a prescribed metal mold 122 is fastened through the medium of an injection tube 121.

In the roller producing apparatus constructed as described above, the roller is produced as follows.

First by evacuating the interior of the hollow piston member 119 and the interior of the hollow cylindrical member 115, the liquid molding material in the storage tank 111 is forwarded to fill the interior of the hollow cylindrical member 115 and the interior of the hollow piston member 119. Then, the prescribed metal die 122 is fastened to the hollow piston member 119 through the medium of the injection tube 121. Subsequently, the hollow piston member 119 is lowered by the elevating device 117 of the support frame 118. As a result, the liquid molding material 8 which has filled the interior of the hollow piston member 119 is caused to flow into the metal die 122. After the hollow piston member has descended to the lowermostpart of the hollow cylindrical member 115, the hollow piston member 119 is elevated by the elevating device 117 of the support 118. Consequently, the liquid molding material held in the storage tank 111 is allowed to flow into the hollow cylindrical member 115. When the vertical reciprocation of the hollow piston member 119 is repeated, the metal die 122 is filled with the prescribed amount of the liquid molding material 8 and the inner pressure of the metal die 122 and the pressure for upward push given to the hollow piston member 119 are equilibrated. Consequently, the interior of the metal die 122 is pressed and the liquid molding material 8 is set to give rise to a roller.

In the present working example, the liquid molding material 8 can be continuously fed into the hollow cylinder member 115 because the hollow cylindrical member 115 provided with the valve member 116 is disposed inside the storage tank 111, the vertically movable hollow piston member 119 is inserted into the hollow cylindrical member 115, and the prescribed metal die 122 is fastened to the upper part of the hollow piston member 119 through the medium of the injection tube 121. Further the cleaning of the set material can be easily carried out because the apparatus itself has a simple construction. Thus, the roller can be manufactured with high efficiency.

What is claimed is:

1. A fixing roller having a core shaft, a core shaft proper with opposite ends, support parts at said opposite ends of said core shaft proper and a rubber or plastic-coated layer having opposite ends provided on a periphery of said core shaft proper, comprising an inward tapered surface on said opposite ends of said core shaft proper, excepting said support parts, and on said opposite ends of said rubber or plastic-coated layer, wherein said tapered surfaces form one continuous tapered surface at each one of said opposite ends.

2. The roller of claim 1, wherein said rubber or plastic-coated layer is a silicone rubber.

3. The roller of claim 1, wherein an angle formed between a central axis of said core shaft and said tapered surface on said opposite ends of said core shaft proper is the same as an angle formed between the central axis of said core shaft and said tapered surface on said opposite ends of said rubber or plastic-coated layer.

4. The roller of claim 1, wherein an angle formed between a central axis of said core shaft and said tapered surface on said opposite ends of said core shaft proper is different than an angle formed between the central axis of said core shaft and said tapered surface on said opposite ends of said rubber or plastic coated layer.

5. A fixing roller having a cylindrical core shaft comprising:
   a cylindrical core shaft proper having opposite ends with end faces at each one of said opposite ends, said end faces comprising surfaces tapered inward toward a central axis of said core shaft at a constant angle;
   a support part at each one of said opposite ends, said end faces of said core shaft proper being tapered inward toward said support parts; and
   a rubber or plastic-coated layer having opposite ends with end faces provided on a periphery of said core shaft proper, said end faces comprising surfaces tapered inward toward the central axis of said core shaft at a constant angle, said tapered surfaces of said core shaft proper and said layer forming one continuous tapered surface at each one of said opposite ends, and wherein said tapered surface continues to said opposite ends of said core shaft proper where said tapered surface meets said support part at each one of said opposite ends.

6. The fixing roller of claim 5, wherein an angle formed between the central axis and said tapered surface of said core shaft proper is the same as an angle formed between the central axis and said tapered surface of said layer.

7. The fixing roller of claim 5, wherein an angle formed between the central axis and said tapered surface of said core shaft proper is different than an angle formed between the central axis and said tapered surface of the layer.

* * * * *